Nov. 21, 1967     F. C. STEGEMAN     3,354,099
POLYURETHANE-HYDRAULIC CEMENT COMPOSITIONS AND PROCESS
FOR MANUFACTURING THE SAME
Filed March 10, 1964

*FIG. 1.*

Mix Polyurethane Ingredients
↓
Mix With Polyurethane Reactants Dry Hydraulic Cement
↓
Place Resulting Mixture In Desired Configurate
↓
Subject Resulting Mixture To Water Vapor, Forming Body
↓
Hydrate Hydraulic Cement By Imersion
↓
Dry Resultant Body

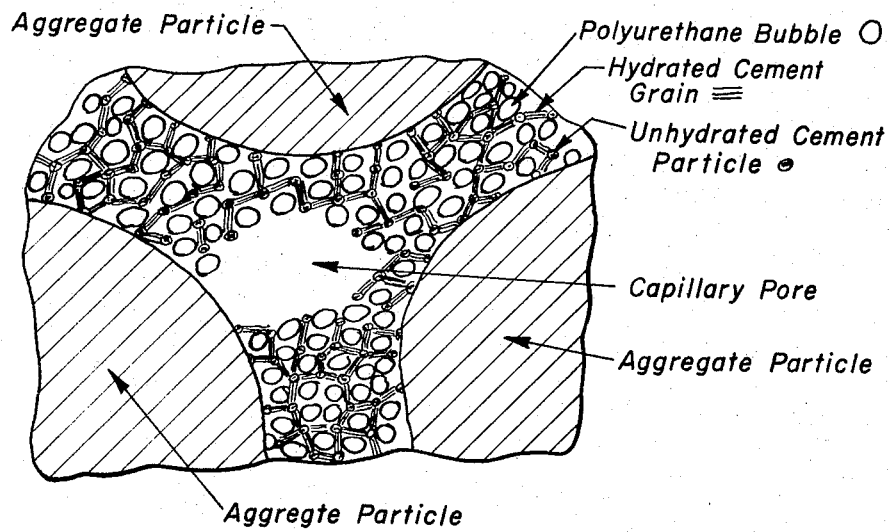

*FIG. 2.*

Aggregate Particle
Polyurethane Bubble ○
Hydrated Cement Grain ≡
Unhydrated Cement Particle ⊝
Capillary Pore
Aggregate Particle
Aggregte Particle

INVENTOR.
FREDERICK C. STEGEMAN
BY
EDWARD D. O'BRIAN
ATTORNEY

United States Patent Office 3,354,099
Patented Nov. 21, 1967

3,354,099
POLYURETHANE-HYDRAULIC CEMENT COMPOSITIONS AND PROCESS FOR MANUFACTURING THE SAME
Frederick C. Stegeman, 9 Reedsdale St., Allston, Mass. 02134
Filed Mar. 10, 1964, Ser. No. 350,823
12 Claims. (Cl. 260—2.5)

This invention relates to polyurethane-hydraulic cement compositions. It also relates to processes for forming these compositions from unhydrated hydraulic cement particles and ingredients which, when reacted, yield a polyurethane resin.

As used herein, the term "hydraulic cement" is intended to designate inorganic materials or compositions which are capable of serving as adhesives when hydrated so as to unite fragments and masses of a relatively inert character. A large number of different materials fall within the broad scope of this definition. Included within this definition are various naturally occurring cements, natural and artificial pozzolanic cements, as well as more conventional cements such as blast furnace slag cement, aluminous cements, and portland cements based upon systems of alumina, calcia, and silica.

Because portland cements are by far the most commonly used and prevalent of such hydraulic cements, the present invention is primarily concerned with polyurethane-portland cement compositions and with processes for forming these compositions. The new compositions of this invention are, in effect, designed so as to improve upon various characteristics of closely related conventional portland cement concrete type compositions.

Such compositions are frequently referred to as either cement mortars or as concrete depending upon whether they contain relatively small inert particles such as sand or comparatively coarse, inert particles such as gravel aggregate, bloated aggregate or the like. Obviously the properties of such compositions will depend upon a large number of factors including the nature of inert particles used with them. In general the properties are all related to at least a reasonable degree.

Conventional portland cement concrete and related compositions are comparatively brittle. Their tensile strengths are normally one-tenth of their compressive strengths. These factors are important with respect to virtually all of the uses of conventional portland cement concrete. They are especially important when for structural reasons it is necessary to use portland cement concrete in connection with other structural materials such as steel rods, bars or steel cable.

Conventional concrete compositions are well-known to be comparatively heavy and dense. Even compositions of this type using exfoliated or bloated inert fillers at times are disadvantageous for many desired uses because of their weight. The weight to strength ratios of conventional portland cement concrete compositions are also important. Such compositions are initially relatively weak and develop ultimate strengths only after a prolonged period.

As a consequence of these and various related factors which are important to varying degrees in different specific circumstances, conventional hydraulic cement compositions are frequently classified as undesirable or only partially desirable for certain specific uses. This is considered to be unfortunate, since as a class, hydraulic cements are relatively available, inexpensive, easy to use materials. Whenever a more expensive material than a hydraulic cement is used because of one or more of these factors it is considered that there is an economic disadvantage.

Various objects of this invention are to provide new and improved hydraulic cement compositions which overcome certain of the above-noted factors serving to limit the use of hydraulic cements in various applications. Thus, an object of this invention is to provide compositions as indicated which possess relatively good compressive strengths and which also possess sufficient tensile strengths so that these strengths are capable of being considered in design activities. A related object of this invention is to provide compositions of the class described which have strain characteristics such that smaller quantities of reinforcing steel or the like can be used with them than are conventionally used with cement compositions. A further related object of this invention is to provide new and improved compositions which have a relatively low density and which have relatively high early and final strengths.

An object of this invention is to provide processes for manufacturing polyurethane-hydraulic cement compositions which may be easily and conveniently carried out at a comparatively nominal cost. Another related object of the present invention is to provide processes of this type which can be used in the production of mortar or mortar-like bodies or concrete or concrete-like bodies without stratification or segregation of the material in these bodies.

These and further objects of this invention, as well as various specific advantages of it will be more fully apparent to those skilled in the art to which the invention pertains from a detailed consideration of the remainder of this specification, the appended claims and the accompanying drawing in which:

FIG. 1 is a flow diagram indicating process steps in forming an article in accordance with this invention; and FIG. 2 is an enlarged cross-sectional view of a part of a polyurethane-hydraulic cement body formed in accordance with the teachings of this invention.

From a careful consideration of this drawing and of the remainder of this specification those skilled in the field of hydraulic cement compositions will realize that the accompanying drawing is merely intended for explanatory purposes so as to facilitate an understanding of this invention. For this reason the drawing is not to be taken as limiting this invention in any respect.

As an aid to understanding this invention it can be indicated in essentially summary form that it concerns polyurethane-hydraulic cement bodies containing hydrated hydraulic cement particles which are bonded to at least one polyurethane resin, this resin being disposed in essentially a lattice-work type of arrangement. Such bodies are formed by mixing the ingredients of a polyurethane resin with hydraulic cement particles and such other particles as may be desired and forming a body from such a mixture. Such a body preferably is placed in a relatively high aqueous humidity until such time as the ingredients of the polyurethane have reacted with one another and with water in the atmosphere so as to form a polyurethane resin of a porous or cellular character giving strength to the body, and then treating the body with water so as to cause hydration of the cement particles.

By necessity any brief summary of this type must omit a number of different considerations which are necessary for an understanding of an invention. The steps in forming a polyurethane-hydraulic cement body in accordance with this invention are more clearly indicated in the flow diagram shown in FIG. 1 of the drawing. From this diagram is can be seen that the initial step required is forming a mixture of the ingredients of a polyurethane resin.

Inasmuch as polyurethane resins are extremely well-known at the present time it is not considered necessary to discuss such ingredients in detail in this specification. Reference is made to the text Polyurethane; Chemistry and Technology by Sanders and Frisch, published Interscience Publishers, New York, N.Y., copyright 1962 and to the text Polyurethane by Dombrow, published Reinhold Publishing Company, New York, N.Y., copyright 1957, for an amplification of a discussion of chemistry of polyurethanes beyond the discussion set forth herein.

In effect there are two essential ingredients to a polyurethane resin composition. The first of these is a polyfunctional isocyanate and the second is a polyfunctional compound in which the functional groups are capable of reacting with isocyanate radicals so as to yield a polymer. The most common of such second compounds are well-known polyethers and polyesters although other polyfunctional compounds having functional groups containing an active hydrogen can be used. Castor oil or castor oil derivatives are also frequently utilized to react with polyfunctional isocyanates. Various secondary ingredients such as coloring agents of an inert character can of course be used with these primary ingredients.

As soon as compounds of the two types indicated in the preceding paragraph are mixed together a reaction commences because of the highly reactive character of the isocyanate radical. This reaction is between the isocyanate radicals and the OH radicals present and yields urethane linkages, forming urethane polymers. This type of reaction is essentially of a time-temperature character. The higher the temperature, the more rapid the reaction up to a point where degradation of the compounds present occurs. As a result of the reactivity of the ingredients of a polyurethane resin, the time when these ingredients are in contact with one another prior to the next two steps in the process is important.

If they are in contact with one another for too long a period a polymer composition will result which cannot be mixed with other materials, and which in due course will become solid. If on the other hand, these ingredients are not in contact with one another for at least a significant period prior to the second succeeding step of the process being carried out, the isocyanate radicals in an unreacted form will react with water so as to produce an unstable product which will in turn break down, forming carbon dioxide gas and an amine derivative of the isocyanate. Such an amine derivative will in turn react with isocyanate radicals present so as to form your urea linkages. The strengths of such linkages are comparatively weak, and, hence, if they are present in the final product to an undesired extent, they will tend to detrimentally effect the properties of this product.

From this discussion it will be apparent that the initial mixing step should be of relatively short duration. With toluene diisocyanate mixtures of the 2,4-isomer and the 2,6-isomer used as a polyfunctional isocyanate and a polyether or a polyester such as a polyester formed from adipic acid (three moles) and trimethylol propane (4.2 moles) and closely related mixtures preferred results are achieved by allowing the ingredients to be in contact with one another from about six to fourteen minutes prior to the second subsequent step herein described. If these ingredients are in contact with one another for a longer period it becomes difficult and then impossible to carry out the following steps in the process. Further, if they are in contact for shorter periods what is considered to be an excess of unreacted isocyanate radicals remain available to react with water during the second subsequent step, resulting in the presence of comparatively large gas holes or cellular cavities and resulting in urea linkages affecting the properties obtained.

It will be apparent from subsequent portions of this specification that gas holes or cellular cavities are desired in a final urethane-hydraulic cement body or composition of the cement. However, such cavities are preferably limited in size so that the physical characteristics of such a composition or body are not detrimentally affected. Also, the size and quantity of such cavities should be related to the quantity of urethane linkages obtained so as to minimize the number of lower strength urea linkages present.

Because of these factors it is presently considered that preferred results can be obtained in proportioning the two types of urethane producing ingredients used in from approximately the stoichiometric proportions of such ingredients to about a proportion in which an excess of about 20% of isocyanate radicals is present. More careful control of gas hole or cell formation can be achieved by utilizing from 5% to 10% excess isocyanate radicals over the number of such radicals required to react with the other reactive group or groups employed.

From a consideration of the preceding it will be realized that so-called "pre-mixes" of a polyfunctional isocyanate and diols or other reactive compounds may be substituted for the separate reactants herein discussed. Such "pre-mixes" are partially reacted when utilized and contain unreacted isocyanate groups or radicals. Because of this the time available when such "pre-mixes" are used in order to carry out subsequent steps of the process herein explained is decreased significantly over the time available to carry out these same steps when the reactants are separately mixed together as herein indicated.

As is illustrated by the flow diagram, the second step in manufacturing a polyurethane-hydraulic cement composition or body in accordance with this invention involves mixing liquid urethane materials as described in the preceding with "dry" ingredients consisting of hydraulic cement particles, and various inert or substantially inert materials, if the presence of these materials is desired in the final product. Normally such inert materials are common sand, gravel, crushed rock aggregate or so-called bloated aggregate formed by exfoliating various shales, clays or the like. The proportions of such inert fillers to the hydraulic particles present may be varied over extremely wide limits. As implied by the preceding such inert fillers may be omitted, although this is not normally desired because of economic considerations. In general if the proportion of such inert fillers is too great the strength of the final product herein described will be decreased to an undesired extent.

At the present time it is considered that hydraulic cement particles should be present in a ratio by weight to the inert materials employed which corresponds to the ratio between these two types of ingredients used in conventional mortars or concretes. Thus, if a mortar-like composition in accordance with this invention is to be produced from about ¼ to about 1 part by weight of hydraulic cement particles should be used per part by weight of inert particles. If, on the other hand, a concrete-like composition in accordance with this invention is to be obtained a proportion should be utilized of from about $\frac{1}{15}$ to about ⅓ by weight of hydraulic cement particles per part by weight of inert particles.

In general these proportions are applicable regardless of the type of hydraulic cement particles employed in practicing this invention. These proportions will, of course, vary to a minor extent in accordance with the sizes of the hydraulic cement particles used and the sizes of the inert or substantially inert filler particles employed. Specific adjustments in proportions from the proportions indicated in order to obtain maximum strengths with various different materials can be determined through the use of simple routine experimentation.

The hydraulic cement particles used with this invention are preferably particles of cements based upon compounds containing primarily alumina, calcia and silica. Such cements are frequently classified as blast furnace slag cements, aluminous cements and portland cements—depending upon the relative proportions of the oxides $CaO$, $SiO_2$ and $Al_2O_3$ found within them and the manner in which these oxides are chemically combined to form various compounds having hydraulic properties.

It is presently preferred to utilize with this invention common portland cements containing from 35% to 50% by weight tricalcium silicate, 22% to 36% by weight dicalcium silicate and 8% to 14% by weight tricalcium aluminum and 7% to 9% by weight tetracalcium alumino ferrite. In addition common portland cements contain minor proportions of other compounds. Such portland cements are preferred for use in this invention because of their availability, cost and their reactivity with respect to polyurethanes, and in particular with respect to the isocyanate radicals present in the formation of a polyurethane polymer.

The reactivity of isocyanate radicals makes it preferable that the hydraulic cement and inert materials used in practicing the present invention be utilized in a dry or essentially dry state. Thus, they may contain chemically combined or so-called "pore" water which is not readily available to enter into reactions. If any significant amount of water is present on or with such materials when they are added to a mixture of polyurethane ingredients as herein discussed the water present will tend to react with the isocyanate radicals, yielding unstable amines which in turn will break down, yielding carbon dioxide which in turn causes premature foaming of the mixture as it is being created. This foaming will make the processing of forming a complete mixture undesirably difficult. Further, since the amines created by this break down will react with the isocyanate radicals present creating urea linkages before a desired quantity or proportion of urethane linkages are created there will be an undesired effect on the strengths obtained by continuing the process described herein.

Hence, it is considered preferable to dry the so-called dry ingredients employed with this invention either in a kiln or an oven at an elevated temperature prior to such materials being used. Preferably they should be used at about room temperature so as to avoid "speeding up" the urethane creating reaction as they are added to the ingredients of polyurethane so as to prevent premature stiffening of the resulting mixture.

In forming this mixture the proportions of the so-called dry and urethane ingredients can be varied within comparative wide limits. In order to achieve as high strength as reasonably possible it is presently preferred that sufficient of the urethane ingredients be mixed with the hydraulic cement and other dry ingredients if any are used so that the substantially all of these dry ingredients are coated or wetted by the liquid composition. If less than this quantity is used the uncoated or unwetted hydraulic cement particles are not contacted by the urethane so as to be capable of reacting with it. If on the other hand a significant excess of urethane ingredients over the quantity necessary to completely coat or wet the dry particles present is utilized the final composition or body produced in practicing this invention will contain phases or areas in which the properties are those of the urethane alone.

The precise ratios between the weight of the polyurethane ingredients employed and the weight of the so-called "dry" ingredients will, of course, vary, depending upon the specific sizes of the dry materials added as well as whether or not these dry materials are graded as to size so as to be capable of being packed into a comparatively dense structure. For the purposes of this invention the hydraulic cement particles used should normally be ground so as to pass a standard 325 Tyler screen in order to present as great a reactive surface per unit of weight as reasonably possible. However, it is not necessary that inert materials used as filler be of any specific size other than a size which can be readily handled. At present it is considered that with hydraulic cement particles of the size indicated and with inert fillers of the type used in either mortars or concrete the ratio of the weight of urethane ingredients to the weight of dry ingredients should be from about $1/10$ to about $1/2$.

The actual mixing of the so-called "dry" ingredients and the urethane ingredients in the second step of the process herein explained may be accomplished in virtually any desired maner. Thus, these ingredients may be mixed by hand or using conventional mortar or cement mixing equipment. Such mixing should, of course, be carried on for a sufficient time to obtain a comparatively homogeneous mass of material, and no longer than is required in order to obtain such a mass. In general the presence of significant amounts of volatile solvents tending to aid in the wetting of solids by a liquid urethane type composition should be avoided because of the cost of such solvents. If desired restricted quantities of conventional polyurethane foam additives can be added at this step or be included in an earlier stage with the urethane ingredients.

After the various ingredients have been mixed together these ingredients are formed into a desired shape in the next step in carrying out the process herein described. In case a polyurethane-hydraulic cement composition is being created to be used as mortar, at this point the composition can, but is preferably not applied to a surface in its intended matter. However, normally it is preferred to use a polyurethane-hydraulic cement composition of this invention in order to form a body of a specific shape and configuration. The mixture prepared as described in the preceding is best formed to a desired shape and configuration in this step by simply being placed into a common mold.

Virtually any size or shape of mold can be used during this operation. Any mold employed should, however, have at least one exposed or open surface so that moisture can contact the mixture placed within it. Inasmuch as urethanes are well-known adhesives it is preferred that the surfaces of such molds or forming structures be coated with a conventional release agents so as to facilitate the removal of the body formed in such molds or forming structures after the mixtures within them have developed an initial strength sufficient to be self supporting. Such release agents preferably are conventional saturated hydrocarbons. Thus, satisfactory results can be achieved using common petroleum jelly as a release agent. Various other release agents such as silicone greases and the like may also be employed for this purpose.

In locating a mixture as described in the preceding in a mold, it is generally not necessary to tamp or vibrate it in order to eliminate air pockets or voids. However, such expedients may be desirable when the mold is of an intricate shape or is a comparatively large size. Further, expedients of this type are considered desirable when the mold used contains intricately shaped reinforcing or other materials which are being embedded with a body created as herein described.

After a mold is filled as described in the preceding the next step of the process is to form a body from the composition within this mold. Such terminology can be slightly misleading in view of the fact that the urethane ingredients within the mixture placed in the mold will, as a function of time, create a comparatively rigid structure. Such a structure can, of course, be used for many purposes. It is not to be considered as being preferred in accordance with this invention since the hydraulic cement particles in it are incapable of hydrating when embedded within a substantially nonporous polyurethane continuous phase so as to exert the type of bonding or cementing normally obtained with such particles. If the mixture placed within a mold as described was merely allowed to sit in a dry atmosphere all that would develop would be essentially a nonporous polyurethane phase constituting a lattice work type of structure surrounding and bonded to various particles.

Because of these and various related factors it is preferred to place a mixture as described within a mold in a humid atmosphere in forming a composition or body of this invention. The reactions that take place during this process are considered critical in obtaining desired properties in a final body or composition. As a mixture of the type described is located within a mold either in or out of a humid atmosphere various reactions creating urethane linkages will transpire. Simultaneously it is believed that the isocyanate groups or radicals present within a mixture tend to react with various oxides within and forming a part of the hydraulic cement particles so as to form areas where there is an adhesive bond between the hydraulic cement particles and the polyurethane composition.

As a mixture of the type described is held within a mold in humid atmosphere water from the atmosphere will gradually permeate the mixture. As this occurs this water will react as described in the preceding with the isocyanate present so as to create unstable compounds which decompose, yielding carbon dioxide gas and amines. These amines in turn will react with the isocyanate groups or radicals present so as to form urea linkages. It is believed that these urea linkages to a degree form chemical bonds with the hydraulic cement particles so as to serve to bond the hydraulic cement particles to the polymer composition created.

The carbon dioxide gas given off by these reactions forms comparatively minute gas pockets, giving the polymer network or lattice within the body created as herein described a porous character. This porous character is considered to aid in allowing atmospheric moisture to enter the mixture within a mold during this step of the invention. It is also considered important since it tends to break up this polymer network to a degree sufficient that the polymer network can subsequently be entered by water during the following step of the process herein described in order to permit the hydration of the hydraulic cement particles.

The amount of moisture contacting a mixture within a mold during this step of the process is considered important. From the aforegoing it will be seen that if too little moisture permeates a mixture before the urethane ingredients are reacted a substantially imporous polymer structure is created. If on the other hand too much moisture is contacted with a mixture within a mold comparatively large gas holes or pockets will be created which detrimentally affect the strength of the body being created.

With this invention it has been discovered that a balance between these factors can be achieved by contacting a mixture as described within a mold with a comparatively humid atmosphere. It is presently preferred to utilize for this purpose air at a temperature of from 15° C. to 100° C. which is saturated with the water vapor. Satisfactory results which are acceptable for most purposes can be obtained by utilizing as low as 50% humidity in an air within these temperatures. Any direct contact of water with the mixture within the mold should, of course, be prevented.

The time required in order to enable a body being formed within a mold from a mixture as herein described to become sufficiently rigid so that it can be removed from the mold is, of course, a variable depending upon such factors as the temperature of the mixture and the degree to which reactions between urethane producing ingredients have transpired for the mixture placed within the mold. In general a time is required which is sufficient for most of the functional groups on the organic molecules or polymers present to react. Satisfactory times in order to form a substantially rigid structure in a mold have been found to be at least one hour. No significant detriment will be achieved by leaving a mixture within a mold for a longer period.

The next step in the process herein described consists of hydrating the hydraulic cement particles in a body created as described in the preceding. This hydration is, of course, to be distinguished from any token or minute hydration which will occur through the use of a humid atmosphere as described in connection with the preceding step in the process. Although such hydration can at least in theory be achieved by immersing a body formed as herein described in water while it is in a mold this is not considered preferable since it does not allow water to simultaneously enter all surfaces of the body. Unless water enters all surfaces of the body simultaneously it is considered that significant unequal amounts of hydration will occur in various regions of the body, and that this in turn will result in different strength characteristics in different parts of the body.

In order to achieve the desired hydration or curing of hydraulic cement particles it is preferred to remove a body as described in the preceding from a mold and to immerse the body in water. During this process hydration of well-known cement compounds occurs, forming hydrates which are believed to bond any inert materials present in the manner in which bonds are formed in common Portland cement. Inasmuch as different compounds within any specific hydraulic cement hydrate and form bonds at different rates it is considered that the strengths developed at different time intervals are related to the action of these different compounds.

It has been discovered that immersion periods of from about 2 to about 9 days in water at "room" temperature of from about 68° F. to 100° F. with compositions of this invention give in these compositions peak compressive strengths, and that compressive strengths gradually decrease with immersion past these periods. It has also been discovered that significant peak tensile strengths are achieved through immersion within these periods. After such immersion the resulting products are capable of being directly used for some purposes.

The strengths referred to in the preceding paragraph are not achieved solely as a result of immersion; for them to be achieved in a body of material formed as herein described must be removed from the water and dried. Such drying should be at a temperature well below a temperature at which any hydration bonds are broken. Satisfactory results can be achieved with drying temperatures within the range of 0° C. to 120° C. This drying should be continued until there is no significant further loss of water. After drying a product as herein described can be utilized.

It is believed that these unique strength characteristics are results of several factors. During the hydration of Portland cement type compounds it is well-known that swelling occurs. It is considered that this swelling occurs unrestricted in a polyurethane-hydraulic cement body as herein described because of the voids or gas pockets created prior to immersion. It is considered that this is related to the hydrates formed from the inorganic cement compounds disrupting the physical structure of the polyurethane. The gradual strength fall-off after a prolonged immersion is considered to be a consequence of prolonged water contact gradually causing a deterioration and weakening of the urethane network or lattice structure, probably at the points of bonding between the polyurethane and the hydraulic cement particles.

After immersion a polyurethane-hydraulic cement body or composition as herein described is, of course, removed from the water and is ready to utilize after at least surface water is removed from it. Such a body possesses relatively good compressive and tensile strength. The latter are sufficient so as to be capable of being taken into consideration in design calculations. Also a body formed as indicated has sufficiently good strain characteristics that of reinforcing material such as steel is used with it a smaller quantity of such material is required than with a conventional cement mortar or concrete. Further, a body of this type has a relatively low density and comparatively early and final strengths. The latter, of course, develop over a prolonged period.

A hydraulic cement-polyurethane composition or body as herein described is considered to be unique and advantageous not only because of various factors briefly summarized in the preceding paragraph. These compositions or bodies utilize an organic type adhesive bond between conventional hydraulic cement inorganic materials and a polyurethane polymer, and still achieve strengths resulting from the conventional hydration of cement particles. This has been demonstrated in several ways. One of these is that the results described or indicated have not been achieved from compositions as indicated herein by omitting hydraulic cement particles. This is considered to evidence the presence of a new "technical effect" with the subject matter of this specification.

The nature of a polyurethane hydraulic cement body formed in accordance with this invention as well as the the character of the bonded area of such a body is indicated in FIG. 2 of the drawing. In this enlarged cross-sectional view of a part of a polyurethane hydraulic cement body created as indicated by the preceding discussion there are shown a number of inert aggregate particles which are separated by and bonded together through the use of polyurethane bubble-like areas forming a lattice work type of structure which is permeated by hydrated cement areas, these hydrated cement areas connecting various grains or particles of non-hydrated cement. These areas of hydrated and unhydrated cement form what can be considered a mating and/or interlocking lattice work type of structure engaging the polyurethane structure. As indicated in FIG. 2 the particles of non-hydrated cement are dispersed generally between the polyurethane cell structures. One or more capillary pores as indicated normally permeate the areas occupied by the polyurethane and the hydrated and unhydrated cement. These capillaries are considered to be significant in enabling water to enter a complete body so as to cause the hydration of the various cement particles or grains.

In order to facilitate an understanding of the present invention the following specific examples are given in this specification. It is to be understood that these specific examples are not to be taken as limiting this invention in any respect.

*Example 1*

In manufacturing a polyurethane-hydraulic cement body or composition of this invention the following steps can be followed:

A mixture of one part by weight common sand and one-quarter part by weight type I standard portland cement ground to minus 325 mesh is prepared and oven dried at about 100° C. until any loss of weight ceases. This mixture is then allowed to cool under conditions where it does not absorb moisture from the air until it reaches room temperature and is then stored under these conditions until it is used.

Next a stoichiometric mixture of toluene diisocyanate (mixture of 80% by weight 2,4 isomer and 20% by weight 2,6 isomer) and a polyester formed from 3 moles of adipic acid and 4.2 moles of trimethylol propane is prepared and is allowed to stand for approximately 6 minutes. As this mixture is allowed to stand the interior of a suitable mold such as a mold approximately 3 inches in diameter and 3 inches deep having an open top is coated with a layer of common petroleum jelly. After this 6 minute period has passed one part by weight of the liquid polyurethane mixture is mixed as rapidly as conveniently possible with ten parts by weight of the dry mixture specified above.

This mixture is then placed within the mold with a nominal amount of agitation. The mold is then placed in air at 60° F. which is saturated with water vapor (100% humidity), and left in this atmosphere for a period of one hour. After the end of this period the mold is disassembled so as to remove a solid body which has been formed within it and immersed in common tap water at about 60° F. for a period of two days. The body is then removed from the water and is dried in air at 0° C. until no further loss of weight occurs. The body is then ready for testing for use.

*Example 2*

In manufacturing a polyurethane-hydraulic cement body or composition of this invention the following steps can be followed:

A mixture of one part by weight common sand and one part by weight type I standard portland cement ground to minus 325 mesh is prepared and oven dried at about 100° C. until any loss of weight ceases. This mixture is then allowed to cool under conditions where it does not absorb moisture from the air until it reaches room temperature and is then stored under these conditions until it is used.

Next a mixture is prepared of a polyester which has been formed from 3 moles of an adipic acid and 4.2 moles of trimethylol propane and of toluene diisocyanate (a mixture of 80% by weight 2,4 isomer and 20% by weight 2,6 isomer), the compounds within this mixture being proportioned by weight so that an excess of about 20% isocyanate radicals are present over the stoichiometric proportions of such radicals necessary to react with the polyester. This mixture is then allowed to stand for approximately 14 minutes. As this mixture is allowed to stand the interior of a suitable mold such as a mold approximately 3 inches in diameter and 3 inches deep having an open top is coated with a layer of common petroleum jelly. After this 14 minute period has passed one part by weight of the liquid polyurethane mixture is mixed as rapidly as conveniently possible with two parts by weight of the dry mixture specified above.

This mixture is then placed within the mold with a nominal amount of agitation. The mold is then placed in air at 100° C. with a relative humidity of 5%, and left in this atmosphere for a period of one hour. After the end of this period the mold is disassembled so as to remove a solid body which has been formed within it and immersed in common tap water at about 80° F. for a period of nine days. The body is then removed from the water and is dried in air at 100° F. until no further loss of weight occurs. The body is then ready for testing for use.

*Example 3*

In manufacturing a polyurethane-hydraulic cement body or composition of this invention the following steps can be followed:

A mixture of 1 part by weight of aggregate consisting of 1 part by weight cement sand to 15 parts by weight of washed gravel of the type used for concrete pavement, and one third part by weight type I standard portland cement ground to minus 325 mesh is prepared and oven dried at about 100° C. until any loss of weight ceases. This mixture is then allowed to cool under conditions where it does not absorb moisture from the air until it reaches room temperature and is then stored under these conditions until it is used.

Next a mixture is prepared of a polyester which has been formed from 3 moles of an adipic acid and 4.2 moles of trimethylol propane and of hexamethylene diisocyanate and polyester formed from 3 moles adipic acid, 1 mole glycerine and 3 moles 1,3-butylene glycol, the compounds within this mixture being proportioned by weight so that an excess of about 5% of isocyanate radicals are present over the stoichiometric proportions of such radicals necessary to react with the polyester. This mixture is then allowed to stand for approximately 20 minutes. As this mixture is allowed to stand the interior of a suitable mold such as a mold approximately 3 inches in diameter and 3 inches deep having an open top is coated with a layer of common petroleum jelly. After this 20 minute period has passed 1 part by weight of the liquid polyurethane mixture is mixed as rapidly as conveniently possible with 2 parts by weight of the dry mixture specified above.

This mixture is then placed within the mold with a nominal amount of agitation. The mold is then placed in air at 15° C. which is at 50% humidity, and left in this atmosphere for a period of one hour. After the end of this period the mold is disassembled so as to remove a solid body which has been formed within it and immersed in common tap water at about 100° F. for a period of four days. The body is then removed from the water and is dried in air at 100° C. until no further loss of weight occurs. The body is then ready for testing for use.

*Example 4*

In manufacturing a polyurethane-hydraulic cement body or composition of this invention the following steps can be followed:

A mixture of 1 part by weight of aggregate consisting of 1 part by weight cement sand to one part by weight of washed gravel of the type used for concrete pavement and one-fifteenth part by weight type III high early strength portland cement ground to minus 325 mesh is prepared and oven dried at about 100° C. until any loss of weight ceases. This mixture is then allowed to cool under conditions where it does not absorb moisture from the air until it reaches rom temperature and is then stored under these conditions until it is used.

Next a mixture is prepared of a polyester which has been formed from 3 moles of an adipic acid with 4.2 moles of trimethylol propane and of hexamethylene diisocyanate and polyester formed from 3 moles adipic acid, 1 mole glycerine and 3 moles 1,3-butylene glycol, the compounds within this mixture being proportioned by weight so that an excess of about 10% of isocyanate radicals are present over the stoichiometric proportions of such radicals necessary to react with the polyester. This mixture is then allowed to stand for approximately 14 minutes. As this mixture is allowed to stand the interior of a suitable mold such as a mold approximately 3 inches in diameter and 3 inches deep having an open top is coated with a layer of common petroleum jelly. After this 14 minute period has passed 1 part by weight of the liquid polyurethane mixture is mixed as rapidly as conveniently possible with 2 parts by weight of the dry mixture specified above.

This mixture is then placed within the mold with a nominal amount of agitation. The mold is then placed in air at 30° C. which is at 100% humidity and left in this atmosphere for a period of one hour. After the end of this period the mold is disassembled so as to remove a solid body which has been formed within and immersed in common tap water at about 120° F. for a period of six days. The body is then removed from the water and is dried in air at 100° F. until no further loss of weight occurs. The body is then ready for testing for use.

I claim:

1. A process of manufacturing a polyurethane-hydraulic cement body which comprises:
    mixing dry hydraulic cement particles with a partially reacted mixture of at least one organic polyfunctional isocyanate compound wherein the functional groups are isocynato radicals and at least one polyfunctional compound each of the functional groups of which contains an active hydrogen atom and capable of forming a polyurethane;
    forming said mixture into a desired shape;
    exposing said mixture to gas containing water vapor at a temperature of from 15 to 100° C., the quantity of water vapor in said gas being at least that of a specific humidity of at least 50% and being not greater than 200 grains per pound of dry air, said water vapor permeating said mixture and reacting with isocyanato radicals on said isocyanate compound so as to yield carbon dioxide gas and amines, this gas causing the formation of gas pockets within the mixture, these amines further reacting said polyfunctional compounds further reacting during said exposure to water vapor so as to form a polyurethane resin body structure during such exposure;
    hydrating said hydraulic cement particles within said body; and
    drying said body at a temperature below the decomposition temperature of hydrates formed from said hydraulic cement particles.

2. A process of manufacturing a polyurethane-hydraulic body as defined in claim 1 wherein said polyfunctional compounds are in contact with one another a period from about 6 to about 20 minutes prior to being mixed with said hydraulic cement particles.

3. A process of manufacturing a polyurethane-hydraulic body as defined in claim 1 wherein said hydraulic cement particles are hydrated by immersing said body in water at a temperature from 15° to 100° C. for a period from 2 to 9 days.

4. A process as defined in claim 1 wherein said body is dried at a temperature from 0° C. to 120° C. in air until there is no further loss of weight of said body.

5. A process of manufacturing a polyurethane-hydraulic cement body as defined in claim 1 wherein dry inert particles are mixed with said dry hydraulic cement particles.

6. A process of manufacturing a polyurethane-hydraulic cement body as defined in claim 5 wherein from about ¼ to 1 part by weight hydraulic cement particles are present per part by weight inert particles.

7. A process of manufacturing a polyurethane-hydraulic cement body as defined in claim 5 wherein from about ¹⁄₁₅ to ⅓ parts by weight hydraulic cement particles are present per part by weight inert particles.

8. A process of manufacturing a polyurethane-hydraulic cement body as defined in claim 1 wherein from about 10 to about 2 parts by weight dry particles are mixed with 1 part by weight of said polyfunctional compound.

9. A process of manufacturing a polyurethane-hydraulic cement body as defined in claim 1 wherein from about the stoichiometric proportions of said polyfunctional compounds are present to about a 20% excess of said polyfunctional isocyanate compound is present, said 20% being based on the stoichiometric proportions of said compound.

10. A process of manufacturing a polyurethane-hydraulic cement body as defined in claim 1 wherein by weight a 5 to 10% excess of said polyfunctional isocyanate compound is present per stoichiometric quantity of said other polyfunctional compound.

11. A process of manufacturing a polyurethane-hydraulic cement body which comprises:
    preparing a partially reacted mixture of at least one polyfunctional isocyanate compound wherein the functional groups are isocyanato radicals and at least one polyfunctional compound each of the functional groups of which contains an active hydrogen atom capable of forming a polyurethane compound, said isocyanate compound being present in excess over the amount necessary to react to said polyfunctional compound so as to form a polyurethane resin body;
    allowing said mixture of polyfunctional compounds to remain in contact with one another until said polyfunctional compounds react with one another with said mixture remaining a liquid;
    mixing said mixture with from about 2 to about 10 parts by weight of dry material, said dry material containing hydraulic cement particles so as to coat substantially all of said dry material with said mixture;
    locating the resulted mixture of reacted polyfunctional compounds and dry material in a desired configuration;
    exposing said mixture to gas containing water vapor at a temperature of from 15 to 100° C., the quantity of water vapor in said gas being at least that of a specific humidity of at least 50% and being not greater than 200 grains per pound of dry air, said water vapor permeating said mixture and reacting with isocyanato radicals on said isocyanate compound so as to yield carbon dioxide gas and amines, this gas causing the formation of gas pockets within the mixture, these amines further reacting, said polyfunctional compounds further reacting during said exposure to water vapor so as to form a polyurethane resin body structure during such exposure;

immersing the resulting body in water so as to hydrate said hydraulic cement particles, forming inorganic bonds; and drying said body so as to remove uncombined water from said body.

12. A polyurethane-hydraulic cement body produced by the process defined in claim 1.

References Cited

UNITED STATES PATENTS

| | | | |
|---|---|---|---|
| 2,445,052 | 7/1948 | Zimmerman | 106—85 |
| 3,021,291 | 2/1962 | Thiessen | 260—2.5 |
| 3,211,675 | 10/1965 | Johnson | 106—87 XR |

ALEXANDER H. BRODMERKEL, *Primary Examiner.*

LEON J. BERCOVITZ, *Examiner.*

J. J. KLOCKO, P. E. ANDERSON, *Assistant Examiners.*